United States Patent
Ozawa

(10) Patent No.: US 8,231,223 B2
(45) Date of Patent: Jul. 31, 2012

(54) PROJECTOR INCLUDING PROJECTION POSITION CONTROLLING UNIT AND SOUND VOLUME ADJUSTING UNIT

(75) Inventor: Takashi Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 541 days.

(21) Appl. No.: 12/499,840

(22) Filed: Jul. 9, 2009

(65) Prior Publication Data

US 2010/0134764 A1 Jun. 3, 2010

(30) Foreign Application Priority Data

Nov. 28, 2008 (JP) ................................. 2008-303768

(51) Int. Cl.
G02B 17/00 (2006.01)
(52) U.S. Cl. ........................................... 353/15; 353/19
(58) Field of Classification Search ............... 353/15, 353/19, 101
See application file for complete search history.

(56) References Cited

U.S. PATENT DOCUMENTS

2008/0180639 A1* 7/2008 Amano et al. .................. 353/24

FOREIGN PATENT DOCUMENTS

| JP | 2004-163453 | | 6/2004 |
|---|---|---|---|
| JP | 2004-163453 | A | 6/2004 |
| JP | 2006-317559 | A | 11/2006 |
| JP | 2007-101836 | A | 4/2007 |
| JP | 2007-316173 | A | 12/2007 |

* cited by examiner

Primary Examiner — Tony Ko
(74) Attorney, Agent, or Firm — AdvantEdge Law Group, LLC

(57) ABSTRACT

A projector includes: a light source; a light modulation device which forms an image by modulating light emitted from the light source according to inputted image information; a projection optical system which projects the image formed by the light modulation device; a projection position controlling unit which controls the projection position of the image by shifting the projection optical system in the left-right direction with respect to the projection direction; a pair of left and right speakers which output sounds corresponding to audio information inputted with the image information; and a sound volume adjusting unit which separately adjusts sound volume levels of the sounds outputted from the pair of the speakers based on the control condition of the projection position provided by the projection position controlling unit.

8 Claims, 7 Drawing Sheets

PROJECTOR INCLUDING PROJECTION POSITION CONTROLLING UNIT AND SOUND VOLUME ADJUSTING UNIT

CROSS-REFERENCE

The present application claims priority from Japanese Patent Application No. 2008-303768 filed on Nov. 28, 2008, which is hereby incorporated by reference in its entirety.

BACKGROUND

In some cases, a projector for projecting images cannot be placed at the front center of a object on which the images are projected such as a screen for the reason of layout of the room where the projector is installed or for other reasons. In such cases, the projector is shifted either to the left or to the right to project images in an oblique direction. However, this arrangement produces a phenomenon of distorting projected images in trapezoidal shape according to the angle of the projector placed in this manner (trapezoidal distortion). When a projector provided with a pair of left and right speakers is shifted from the front center of the screen, an observer positioned at the front center of the screen cannot receive sounds with appropriate sound volume balance of the left and right speakers.

Japanese Patent Publication No. 2004-163453 proposes a projector which has function of correcting trapezoidal distortion by projecting images distorted in the opposite direction beforehand and which is capable of controlling left-right sound balance according to the level of correction for the trapezoidal distortion, that is, installation angles of the projector. According to the projector disclosed in Japanese Patent Publication No. 2004-163453, images and sounds can be provided with no trapezoidal distortion and with appropriate sound volume balance even when the projector cannot be placed at the front center of the screen.

According to the projector of the type which corrects trapezoidal distortion by distorting images in the opposite direction before projection as the projector shown in Japanese Patent Publication No. 2004-163453, distortion of images is achieved by removing a part of pixels constituting images. In this case, images formed by a smaller number of pixels than that of normal images are produced, which lowers the image quality (resolution) of the projected images.

SUMMARY

Various embodiments may solve at least a part of the problems described above.

A projector according to at least one embodiment of the disclosure includes: a light source; a light modulation device which forms an image by modulating light emitted from the light source according to inputted image information; a projection optical system which projects the image formed by the light modulation device; a projection position controlling unit which controls the projection position of the image by shifting the projection system in the left-right direction with respect to the projection direction; a pair of left and right speakers which output sounds corresponding to audio information inputted with the image information; and a sound volume adjusting unit which separately adjusts sound volume levels of the sounds outputted from the pair of the speakers based on the control condition of the projection position provided by the projection position controlling unit.

According to this embodiment, the projection position is controlled by shifting the projection optical system in the left-right direction. Thus, it is not necessary to incline the projector (optical axis of projection optical system) is eliminated even when the projector cannot be placed at the front center of a object on which the images are projected such as a screen. Accordingly, trapezoidal distortion is not produced. That is, lowering of image quality caused by correction for trapezoidal distortion is avoided. Moreover, the sound volume adjusting unit separately adjusts the sound volume levels of the sounds outputted from the speakers based on the control condition provided by the projection position controlling unit. Thus, sound volume balance is appropriate for an observer positioned at the front center of the screen even when the projector is located at a position shifted from the front center of the screen.

The projector according to the above embodiment, wherein the sound volume adjusting unit sets the sound volume level for the right speaker included in the pair of the speakers at a level higher than that for the left speaker when the projection position controlling unit shifts the projection position toward the left from the front center.

According to this embodiment, the sound volume level of the right speaker is increased when the projection position is shifted toward the left from the front center by the projection position controlling unit. When the projection position is located on the left side of the front center, the projector is positioned on the right side of the front center of the projection-receiving object. In this case, the distance between the observer positioned at the front center of the screen and the right speaker is longer than the distance between the observer and the left speaker. Thus, sound volume balance is appropriate for the observer positioned at the front center of the screen by increasing the sound volume level of the right speaker.

The projector of according to any of the above embodiments, wherein the sound volume adjusting unit sets the sound volume level for the left speaker included in the pair of the speakers at a level higher than that for the right speaker when the projection position controlling unit shifts the projection position toward the right from the front center.

According to this embodiment, the sound volume level of the left speaker is increased when the projection position is shifted toward the right from the front center by the projection position controlling unit. When the projection position is located on the right side of the front center, the projector is positioned on the left side of the front center of the screen. In this case, the distance between the observer positioned at the front center of the screen and the left speaker is longer than the distance between the observer and the right speaker. Thus, sound volume balance is appropriate for the observer positioned at the front center of the screen by increasing the sound volume level of the left speaker.

The projector according to any of the above embodiments, wherein the projector further includes a projection position detecting unit which detects the control condition of the projection position. The sound volume adjusting unit adjusts the sound volume levels of the sounds based on the detection result from the projection position detecting unit.

The projector according to any of the above embodiments, wherein the projector further includes an input operation unit which receives input operation. The projection position adjusting unit drives and shifts the projection optical system in response to the input operation received by the input operation unit. The sound volume adjusting unit adjusts the sound volume levels of the sounds based on the input operation.

The projector according to any of the above embodiments, wherein the projector further includes an image reproducing unit which reproduces the image information and the audio information from a recording medium on which the image information and audio information have been recorded.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

A projector which forms images by modulating light emitted from a light source and projects the images to a object on which the images are projected such as a screen (hereinafter only referred to as "screen" in this specification) through a projection lens is now described.

First Embodiment

A projector in this embodiment includes a DVD reproducing unit capable of reproducing DVD, and projects images corresponding to information recorded on a DVD medium. The projector in this embodiment can control the image projection position by shifting a projection lens in the direction perpendicular to the projection direction (optical axis direction) (hereinafter referred to as "lens shift").

Figure 1A:
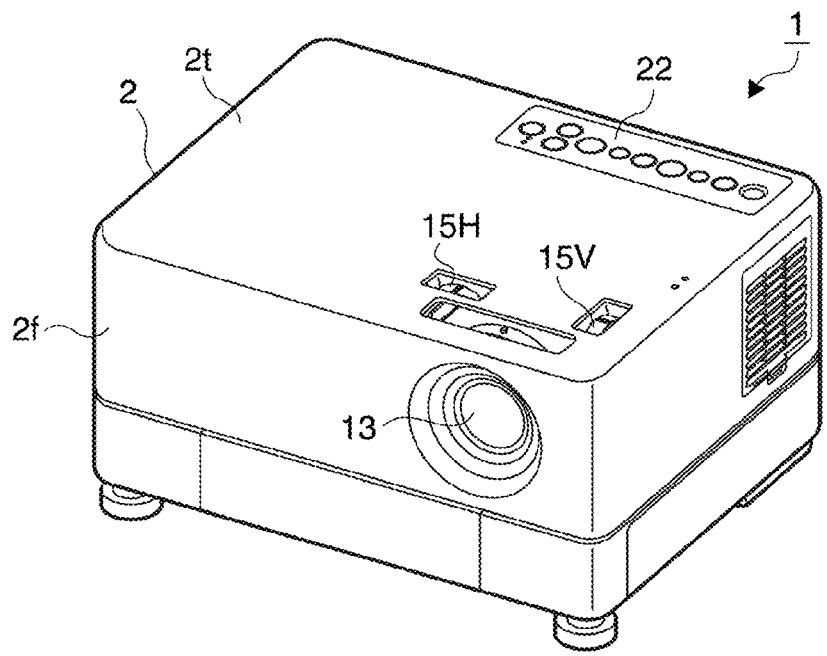
FIGS. 1A and 1B are perspective views of a projector as viewed from the front and the back, respectively.
Figure 1B:
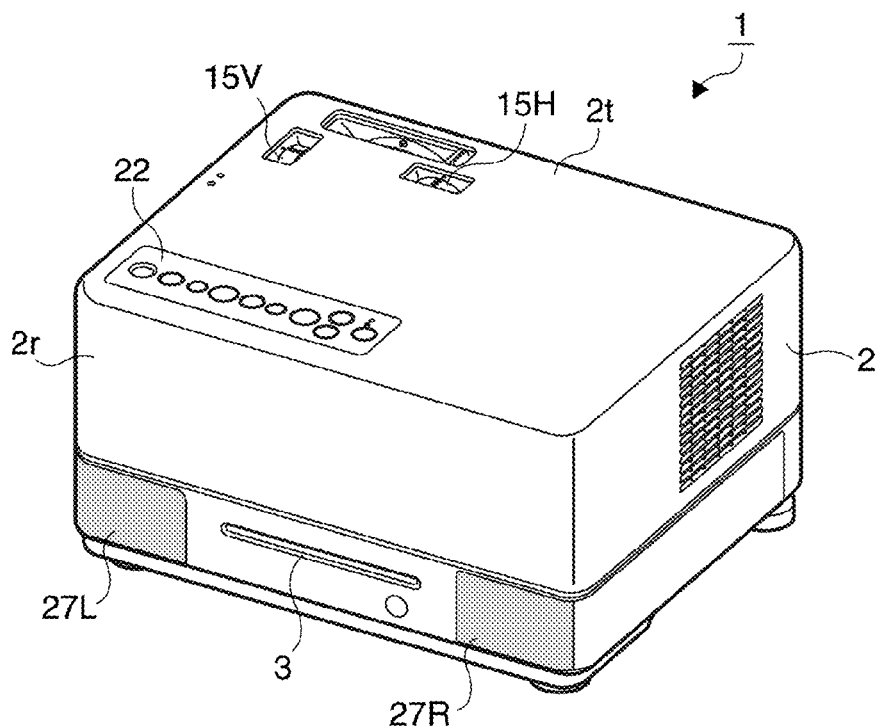

FIGS. 1A and 1B are perspective views of the projector in this embodiment. FIG. 1A illustrates the projector as viewed from the front, and FIG. 1B illustrates the projector as viewed from the back.

As illustrated in FIGS. 1A and 1B, a projector 1 has a housing 2 constituting the outer case for covering a device main body. A projection lens 13 is exposed through a front surface 2f of the housing 2. The projector 1 is installed in such a position that the projection lens 13 faces a screen, that is, the optical axis of the projection lens 13 extends perpendicular to the screen to which images are projected from the projection lens 13. An input operation unit 22 having a plurality of operation keys (operation buttons) is provided on an upper surface 2t of the housing 2. A disk slot 3 through which a DVD medium as recording medium is inserted is formed on a back surface 2r of the housing 2. A pair of left and right speakers 27L and 27R are equipped on the left and right parts of the back surface 2r of the housing 2. More specifically, the speaker 27L for a left channel is disposed on the left part of the back surface 2r, and the speaker 27R for a right channel is disposed on the right part of the back surface 2r. In this specification, the "left-right" refers to the "left-right" as viewed in a direction toward the front (projection direction). Hereinafter, "left (left direction, left side) in the projection direction" is only referred to as "left (left direction, left side)" as well, and "right (right direction, right side) in the projection direction" is only referred to as "right (right direction, right side) as well".

A left-right lens shift dial 15H and an up-down lens shift dial 15V constituting a lens shift mechanism 15 (see FIG. 4) are exposed through the upper surface 2t of the housing 2. The left-right lens shift dial 15H can rotate around the axis extending in the front-rear direction, and the up-down lens shift dial 15V can rotate around the axis extending in the left-right direction. The main body of the lens shift mechanism 15 is disposed within the housing 2 to convert rotation of the left-right lens shift dial 15H and the up-down lens shift dial 15V into linear movements of the projection lens 13. More specifically, the lens shift mechanism 15 shifts the projection lens 13 in the left-right direction with the rotation of the left-right lens shift dial 15H by the user, and shifts the projection lens 13 in the up-down direction with the rotation of the up-down lens shift dial 15V by the user.

Figure 2:
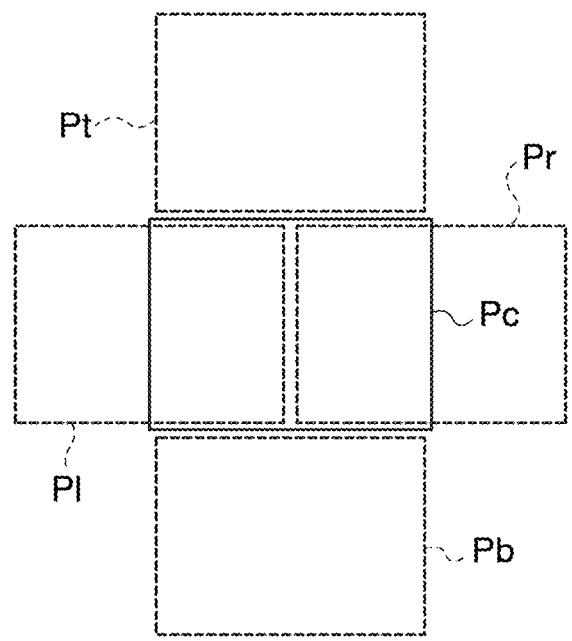
FIG. 2 is a view explaining lens shift, showing positions to which an image is projected (projection positions).
Figure 3:
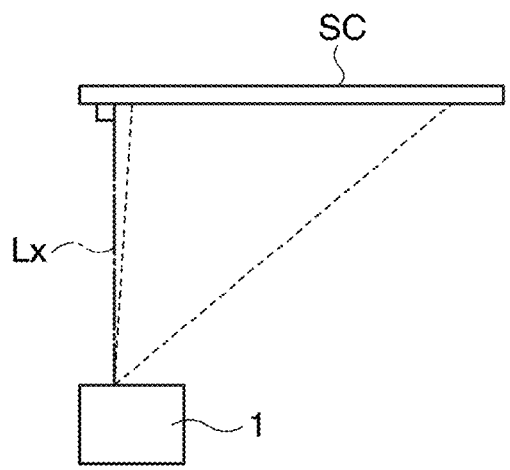
FIG. 3 is a plan view explaining lens shift, showing condition in which the projection position is controlled by lens shift.

FIGS. 2 and 3 are views explaining lens shift. FIG. 2 shows a position to which images are projected (projection position). FIG. 3 is a plan view showing condition in which the projection position is controlled by lens shift.

As illustrated in FIG. 2, an image is projected on the front center of the projection lens 13 (position Pc facing the projection lens 13) when the projection lens 13 is located at a predetermined reference position (such as center position in the shiftable range). When the projection lens 13 is shifted upward by operating the up-down lens shift dial 15V, the position to which the image is projected (projection position) is shifted upward accordingly. When the projection lens 13 is located at the upper end in the shiftable range, the projection position of the image moves to a position Pt shifted upward by approximately one screen from the position Pc. Similarly, when the projection lens 13 is shifted downward by operating the up-down lens shift dial 15V, the projection position of the image is shifted downward accordingly. When the projection lens 13 is located at the lower end in the shiftable range, the projection position of the image moves to a position Pb shifted downward by approximately one screen from the position Pc.

When the projection lens 13 is shifted from the reference position toward the left by operating the left-right lens shift dial 15H, the projection position of the image is shifted to the left accordingly. When the projection lens 13 is located at the left end in the shiftable range, the projection position of the image moves to a position Pl shifted to the left by approximately half screen from the position Pc. Similarly, when the projection lens 13 is shifted toward the right by operating the left-right lens shift dial 15H, the projection position of the image is shifted to the right accordingly. When the projection lens 13 is located at the right end in the shiftable range, the projection position of the image moves to a position Pr shifted to the right by approximately half screen from the position Pc.

As obvious, the projector 1 can project images at a position shifted from the front center of the projection lens 13 by shift lens. Thus, even when the projector 1 cannot be installed at the front center of a screen SC as illustrated in FIG. 3, images can be projected to the screen SC without inclining the projector 1, that is, with no inclination of an optical axis Lx of the projection lens 13 to the screen SC. In the structure which controls the projection position of images by lens shift as in this embodiment, therefore, trapezoidal distortion generated by inclination of the projector 1 (optical axis Lx of projection lens 13) is not produced on images.

Figure 4:
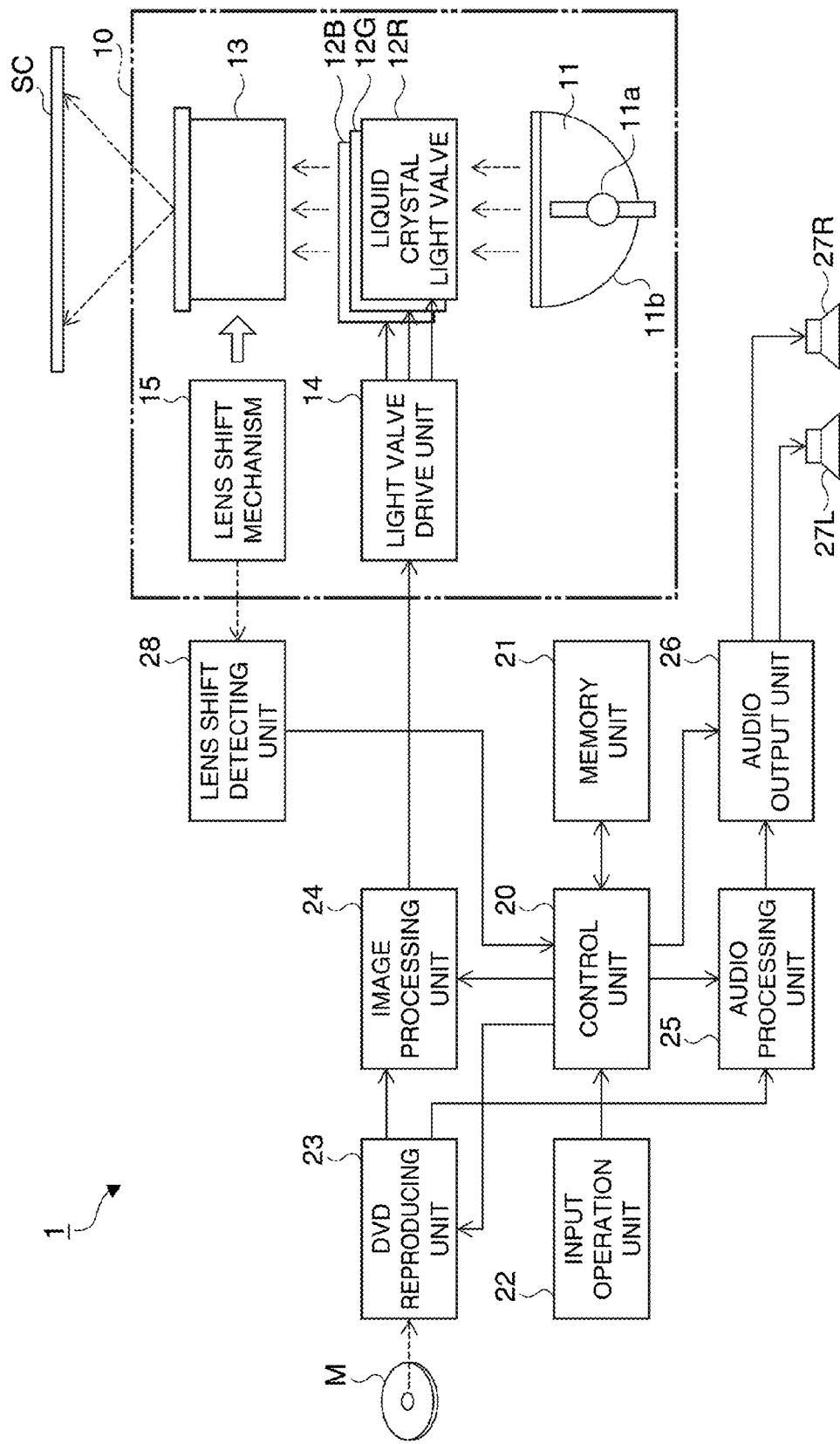
FIG. 4 is a block diagram showing a circuit structure of a projector in a first embodiment.

FIG. 4 is a block diagram showing a circuit structure of the projector 1 according to this embodiment.

As shown in FIG. 4, the projector 1 includes an image projecting unit 10, a control unit 20, a memory unit 21, an input operation unit 22, a DVD reproducing unit 23, an image processing unit 24, an audio processing unit 25, an audio output unit 26, the speakers 27L and 27R, a lens shift detecting unit 28, and other components.

The image projecting unit 10 has a light source 11, three liquid crystal light valves 12R, 12G, and 12B as light modulation devices, the projection lens 13 as projection optical system, a light valve drive unit 14, the lens shift mechanism 15, and others. The image projecting unit 10 corresponds to a display unit which forms images (image light) by modulating light emitted from the light source 11 using the liquid crystal light valves 12R, 12G, and 12B, and projects the images through the projection lens 13 to display the images on the screen SC.

The light source 11 has a discharge type light source lamp 11a constituted by extra-high pressure mercury lamp, metal halide lamp or the like, and a reflector 11b for reflecting light emitted from the light source lamp 11a toward the liquid crystal light valves 12R, 12G, and 12B. Lights emitted from the light source 11 are converted into lights having substantially uniform illuminance distribution by a not-shown integrator system. Then, the converted lights are separated into three primary color light components in red (R), green (G), and blue (B) by a not-shown color separating system, and the respective color lights are supplied to the corresponding liquid crystal light valves 12R, 12G, and 12B.

Each of the liquid crystal light valves 12R, 12G, and 12B is constituted by a liquid crystal panel having a pair of transparent substrates into which liquid crystals are sealed and other parts. A plurality of pixels (not shown) are disposed in matrix on each of the liquid crystal light valves 12R, 12G, and 12B such that driving voltage can be applied to liquid crystal for each pixel. When the light valve drive unit 14 applies driving voltage corresponding to inputted image information to each pixel, light transmissivity of each pixel is set at a value corresponding to the image information. Thus, the lights emitted from the light source 11 are modulated while passing through the liquid crystal light valves 12R, 12G, and 12B to form image lights corresponding to the image information for each color light. The image lights in respective colors thus formed are combined for each pixel into color image light by a not-shown color combining system, and the color image light is expanded and projected on the screen SC or the like by the projection lens 13.

The lens shift mechanism 15 is a unit for controlling the projection position of an image as discussed above, and shifts the projection lens 13 by converting rotations of the left-right lens shift dial 15H and the up-down lens shift dial 15V into linear movements. The lens shift mechanism 15 includes rack and pinion (not shown) for converting rotation of the left-right lens shift dial 15H into linear movement in the left-right direction, rack and pinion (not shown) for converting rotation of the up-down lens shift dial 15V into linear movement in the up-down direction, and other components.

The control unit 20 includes a CPU (central processing unit), RAM (random access memory) for temporarily storing various types of data, and others to collectively control operations of the projector 1 under control programs stored in the memory unit 21. Thus, the control unit 20 functions as a computer in cooperation with the memory unit 21.

The memory unit 21 has rewritable non-volatile memories such as flash memory and FeRAM (ferroelectric RAM). The memory unit 21 stores control programs for controlling operations of the projector 1, various types of setting data for specifying operation conditions of the projector 1 and the like.

The input operation unit 22 has a plurality of operation keys, and receives input operation from the user, that is, operation through the operation keys (pressing keys). The operation keys of the input operation unit 22 include a power source key for turning on and off the power source, a reproduction key for commanding reproduction of DVD, a stop key for stopping reproduction of DVD, a volume key for specifying volume level of sound to be outputted, and other keys. When the user operates any of the operation keys of the input operation unit 22, the input operation unit 22 outputs an operation signal corresponding to the operation of the user (pressed operation key) to the control unit 20. The input operation unit 22 may be constituted by a remote controller (not shown) capable of performing remote operation, In this case, the remote controller outputs an infrared operation signal corresponding to the operation of the user, and a not-shown remote controller signal receiving unit receives and transmits this signal to the control unit 20.

The DVD reproducing unit 23 reproduces DVD contents recorded on a recording medium (DVD medium M). More specifically, the DVD reproducing unit 23 rotates the DVD medium M inserted through the disk slot 3 by a spindle motor (not shown) under the control of the control unit 20, and sequentially scans information recorded on the DVD medium M (data stream) using an optical pickup (not shown) to read the information. The data stream is multiplied information containing coded image information and audio information. The DVD reproducing unit 23 performs processes such as separating the data stream thus read out into image information and audio information, and decoding the separated image information and audio information. Then, the DVD reproducing unit 23 outputs the processed image information to the image processing unit 24, and outputs the processed audio information to the audio processing unit 25. The audio information outputted from the DVD reproducing unit 23 contains audio information for two channels, i.e., the left and right channels.

The image processing unit 24 converts the image information received from the DVD reproducing unit 23 into image information representing gradations of respective pixels of the liquid crystal light valves 12R, 12G, and 12B, that is, image information for specifying driving voltage to be applied to the respective pixels. The image processing unit further performs process for controlling brightness, contrast, sharpness, tone and the like, process for superimposing OSD (on screen display) images such as a menu image and a message image, and other processes for the converted image information under the control of the control unit 20. The image information processed in various ways by the image processing unit 24 is outputted to the light valve drive unit 14.

When the light valve drive unit 14 drives the liquid crystal light valves 12R, 12G, and 12B according to the inputted image information, the liquid crystal light valves 12R, 12G, and 12B form images (image lights) corresponding to the image information. Then, the images are projected on the screen SC through the projection lens 13.

The audio processing unit 25 performs process for controlling sound quality and the like for the audio information received from the DVD reproducing unit 23, and outputs the processed audio information to the audio output unit 26 under the control of the control unit 20.

The audio output unit 26 has not-shown digital-analog converting circuit, amplifying circuit and the like. The audio output unit 26 converts the audio information processed by the audio processing unit 25 into an analog audio signal, and amplifies the audio signal under the control of the control unit 20 to output the amplified signal to the speakers 27L and 27R. When the control unit 20 commands the audio output unit 26 to amplify the audio signal to the sound volume level specified by the volume key of the input operation unit 22, sound corresponding to the audio information received from the DVD reproducing unit 23 is outputted from the speakers 27L and 27R with the sound volume level specified by the volume key. The control unit 20 can separately control (adjust) the left channel sound volume level and the right channel sound volume level. Thus, the audio output unit 26 can set the left channel sound and right channel sound at different sound volume levels under the control of the control unit 20.

The lens shift detecting unit 28 detects control condition of the projection position by the function of the lens shift in the left-right direction, that is, the position of the projection lens 13 in the left-right direction, and outputs the detection result to the control unit 20. The position of the projection lens 13 can be detected by various position detecting units such as an optical sensor and a potentiometer. Alternatively, the rotation angle of the left-right lens shift dial 15H may be detected instead of directly detecting the position of the projection lens 13.

According to the projector 1 having this structure in the embodiment, the control unit 20 can adjust the left-right sound volume balance by controlling the sound volume levels specified by the volume key separately for the left and right channels according to the detection result from the lens shift detecting unit 28. The adjustment of sound volume balance is achieved by multiplying the sound volume level specified by the volume key by the detection result from the lens shift detecting unit 28, that is, individual adjustment coefficients for the left and right channels according to the position of the projection lens 13 in the left-right direction.

Figure 5:
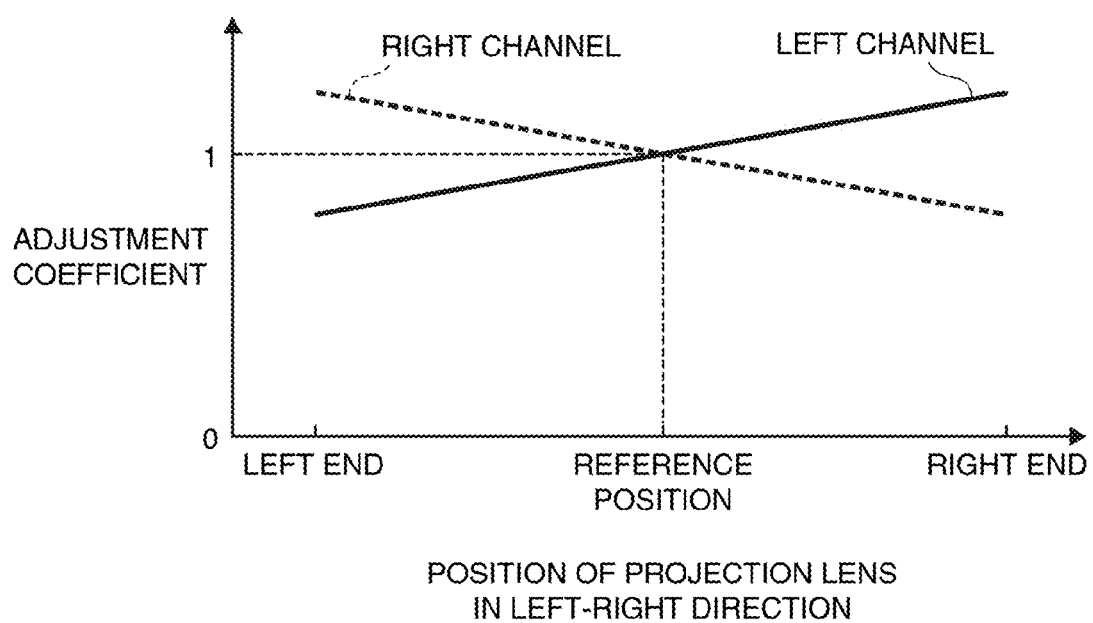
FIG. 5 is a graph showing the relationship between positions of a projection lens in the left-right direction and adjustment coefficients for left and right channels.
Figure 6C:
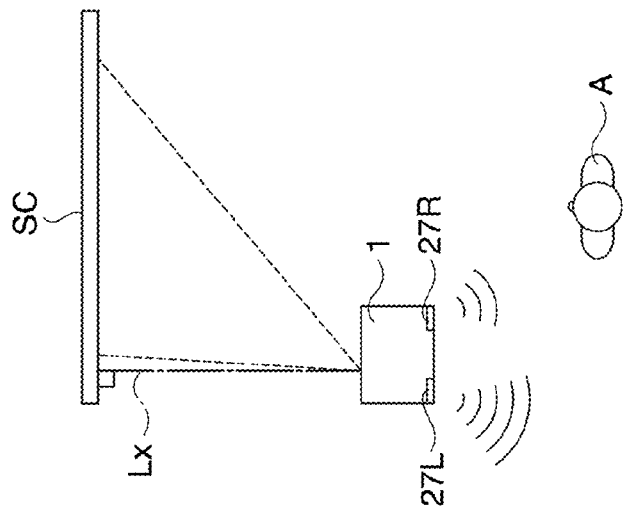
FIGS. 6A through 6C are views explaining adjustment of sound volume balance.
Figure 6B:
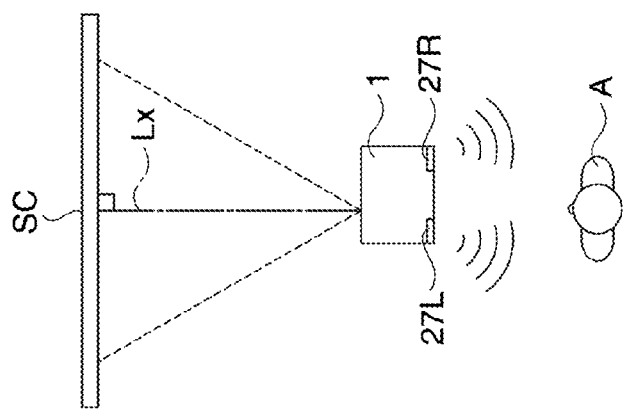
Figure 6A:
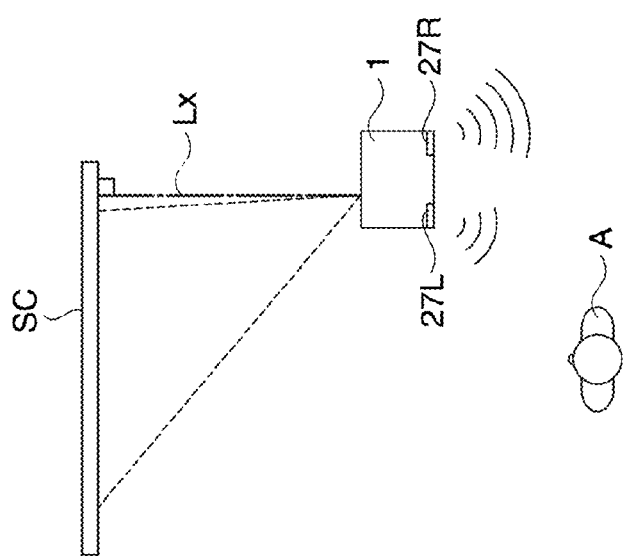

FIG. 5 is a graph showing the relationship between the position of the projection lens 13 in the left-right direction and the adjustment coefficients for the left and right channels. FIGS. 6A through 6C are views explaining adjustment of sound volume balance.

As illustrated in FIG. 5, the adjustment coefficients for the left and right channels are both an equivalent value 1 when the position of the projection lens 13 in the left-right direction is located at the reference position (center in the shiftable range in the left-right direction). The adjustment coefficient for the left channel decreases as the projection lens 13 shifts toward the left from the reference position, and increases as the projection lens 13 shifts toward the right from the reference position. On the other hand, the adjustment coefficient for the right channel increases as the projection lens 13 shifts toward the left from the reference position, and decreases as the projection lens 13 shifts toward the right from the reference position.

When the position of the projection lens 13 in the left-right direction is located at the reference position according to the detection result from the lens shift detecting unit 28, the image is projected toward the front center of the projection lens 13 (position Pc in FIG. 2). Thus, it is estimated that the projector 1 is installed at the front center of the screen SC (see FIG. 6B). When the projection lens 13 in the left-right direction is located at the reference position, the adjustment coefficients for the left and right channels are both 1 as described above. In this case, the sound volume levels of sounds outputted from the left and right speakers 27L and 27R remain as equal sound volume level specified by the volume key. Thus, the sound volume balance of sounds outputted from the speakers 27L and 27R becomes almost appropriate for an observer A positioned at the front center of the screen SC.

When the projection lens 13 is located at a position shifted toward the left from the reference position, the image is projected on the left side of the front center of the projection lens 13. Thus, it is estimated that the projector 1 is located at a position shifted toward the right from the front center of the screen SC (see FIG. 6A). In this case, the distance between the observer A positioned at the front center of the screen SC and the right channel speaker 27R is longer than the distance between the observer A and the left channel speaker 27L. When the projection lens 13 is located at a position shifted toward the left from the reference position, the adjustment coefficient for the right channel is larger than the adjustment coefficient for the left channel as shown in FIG. 5. In this case, the volume level of the sound outputted from the right channel speaker 27R becomes higher than the volume level of the sound outputted from the left channel speaker 27L. As a result, the sound volume balance of the sounds outputted from the speakers 27L and 27R becomes almost appropriate for the observer A positioned at the front center of the screen SC.

Similarly, when the projection lens 13 is located at a position shifted toward the right from the reference position, the image is projected on the right side of the front center of the projection lens 13. Thus, it is estimated that the projector 1 is located at a position shifted toward the left from the front center of the screen SC (see FIG. 6C). In this case, the distance between the observer A positioned at the front center of the screen SC and the left channel speaker 27L is longer than the distance between the observer A and the right channel speaker 27R. When the projection lens 13 is located at a position shifted toward the right from the reference position, the adjustment coefficient for the left channel is larger than the adjustment coefficient for the right channel as shown in FIG. 5. In this case, the volume level of the sound outputted from the left channel speaker 27L becomes higher than the volume level of the sound outputted from the right channel speaker 27R. As a result, the sound volume balance of the sounds outputted from the speakers 27L and 27R becomes almost appropriate for the observer A positioned at the front center of the screen SC.

Though not shown in the figure, the memory unit 21 stores LUT (look up table) corresponding to the graph shown in FIG. 5. The control unit 20 determines the adjustment coefficients corresponding to the positions of the projection lens 13 for each channel based on the detection result from the lens shift detecting unit 28 and the LUT. Then, the control unit 20 multiplies the sound volume level specified by the volume key by the adjustment coefficient, and outputs the calculation result to the audio output unit 26 as sound volume control information. The audio output unit 26 amplifies the audio signals for the left and right channels such that sounds with the sound volume corresponding to the sound volume control information can be outputted. As a result, the volume balance of the sounds outputted from the speakers 27L and 27R becomes almost appropriate for the observer A positioned at the front center of the screen SC. The control unit 20 constantly adjusts the sound volume balance by performing these processes immediately after the power source is turned on by operation of the power source key, or at regular or irregular timing.

The projector 1 according to this embodiment offers the following advantages.

The projector 1 in this embodiment controls the projection position by shifting the projection lens 13 in the left-right direction. In this case, the necessity for inclining the projector 1 (optical axis Lx of projection lens 13) is eliminated even when the projector 1 is not placed at the front center of the screen SC, and thus no trapezoidal distortion is produced. That is, lowering of image quality caused by correction of trapezoidal distortion can be prevented. Moreover, the control unit 20 and the audio output unit 26 separately control the volume levels of the sounds outputted from the speakers 27L and 27R based on the detection result of the position of the projection lens 13 by using the lens shift detecting unit 28. Thus, the sound volume balance appropriate for the observer A positioned at the front center of the screen SC can be achieved even when the projector 1 is shifted from the front center of the screen SC.

More specifically, when the projection lens 13 is shifted toward the left from the reference position, that is, the projection position is shifted toward the left from the front center of the projection lens 13, the projector 1 is located at a position shifted toward the right from the front center of the screen SC. In this case, sound volume balance appropriate for the observer A can be achieved by setting the volume level of the sound outputted from the speaker at a longer distance from the observer A positioned at the front center of the screen SC (right channel speaker 27R) at a level higher than the volume level of the sound outputted from the other speaker (left channel speaker 27L).

Similarly, when the projection lens 13 is shifted toward the right from the reference position, that is, the projection position is shifted toward the right from the front center of the projection lens 13, the projector 1 is located at a position shifted toward the left from the front center of the screen SC. In this case, sound volume balance appropriate for the observer A can be achieved by setting the volume level of the sound outputted from the left channel speaker 27L of the pair of the left and right speakers 27L and 27R at a level higher than the volume level of the sound outputted from the right channel speaker 27R.

In other words, sound volume balance appropriate for the observer A positioned at the front center of the screen SC can be achieved by setting the volume level of the sound outputted from either the left speaker 27L or the right speaker positioned in the shift direction of the projection lens 13, that is, in the shift direction of the projection position at a level lower than the volume level of the sound outputted from the other speaker.

In this embodiment, the lens shift mechanism 15 corresponds to a projection position controlling unit, and the control unit 20 and the audio output unit 26 for adjusting the sound volume level correspond to a sound volume adjusting unit. The DVD reproducing unit 23 corresponds to an image reproducing unit.

Second Embodiment

According to the first embodiment, the projection lens 13 is shifted by rotations of the left-right lens shift dial 15H and the up-down lens shift dial 15V (lens shift). In a second embodiment, however, lens shift is electrically achieved by input operation through the input operation unit 22.

Figure 7:
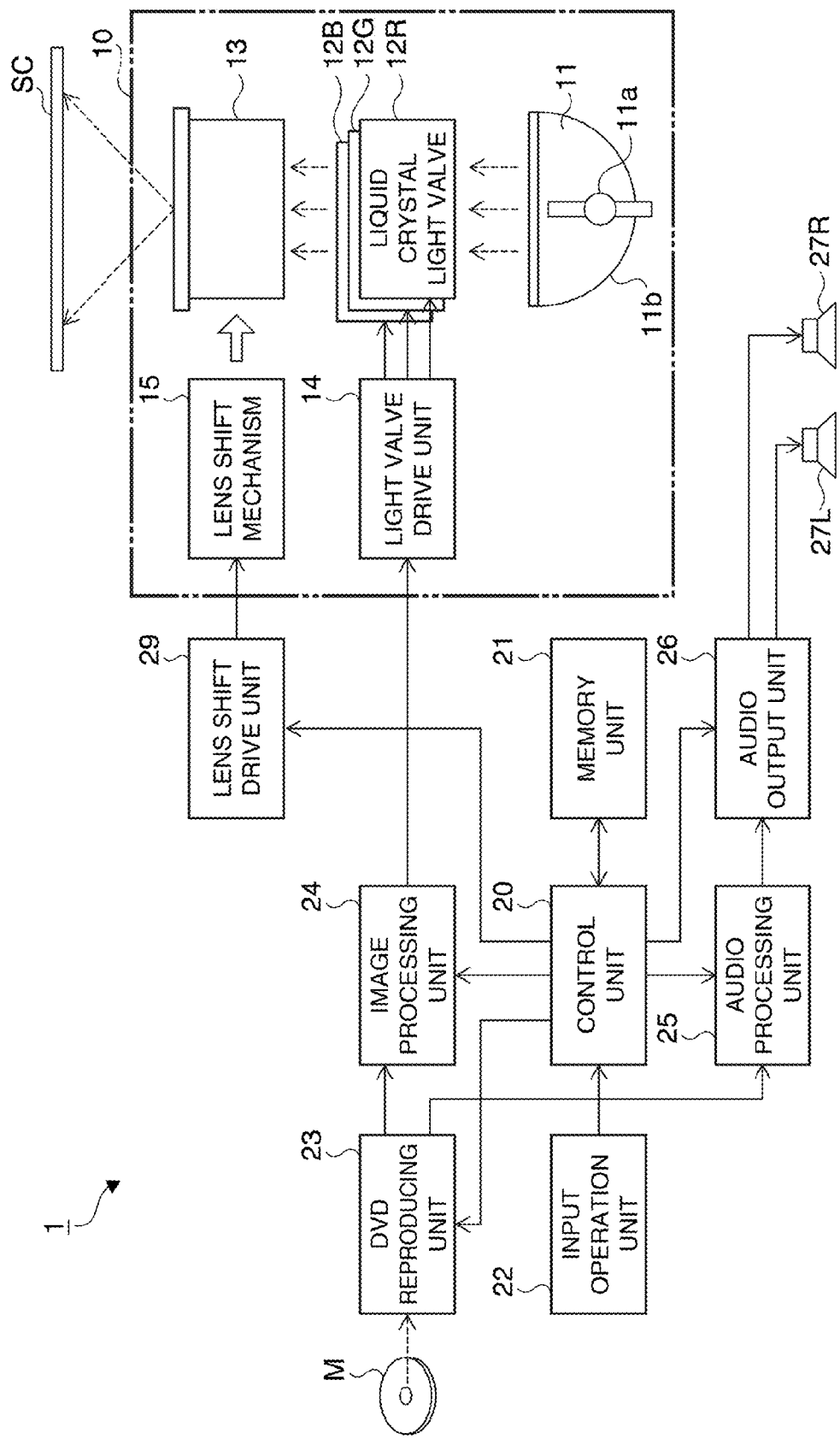
FIG. 7 is a block diagram showing a circuit structure of a projector in a second embodiment.

FIG. 7 is a block diagram showing a circuit structure of the projector 1 according to the second embodiment. As illustrated in FIG. 7, the projector 1 in this embodiment includes a lens shift drive unit 29 constituted by a motor (not shown) and other components. The lens shift drive unit 29 drives the lens shift mechanism 15 under the control of the control unit 20. The lens shift mechanism 15 has rack and pinion (not shown) and other components similarly to that of the first embodiment. The lens shift mechanism 15 converts the rotational drive by the motor contained in the lens shift drive unit 29 into linear movement to shift the projection lens 13 in the up-down and left-right directions.

The input operation unit 22 has four lens shift keys (not shown) corresponding to movements in the up, down, left, and right directions. When the user operates any of the shift keys, the control unit 20 commands the lens shift drive unit 29 to drive the lens shift mechanism 15. Then, the lens shift mechanism 15 shifts the projection lens 13 by the predetermined amount in the direction corresponding to the operated lens shift key. The user can move the projection lens 13 by the necessary amount by repeating operation of the lens shift keys. When the lens shift key is pressed long, that is, when operation of the lens shift key is maintained long, the control unit 20 considers this condition as plural operations of the lens shift key and repeats shifting of the projection lens 13 by the predetermined amount for the corresponding number of times.

The control unit 20 stores the current position of the projection lens 13 in the memory unit 21 as position information every time the projection lens 13 is shifted by operation of the lens shift key. Thus, the control unit 20 can recognize the position of the projection lens 13 based on the position information stored in the memory unit 21 without detection by the lens shift detecting unit 28 (see FIG. 4). When the lens shift key corresponding to one of the up, down, left, and right directions is operated under the condition in which the projection lens 13 is located at the end in the same direction (upper end, lower end, left end, or right end) within the shiftable range, the control unit 20 does not command the lens shift drive unit 29 to drive the lens shift mechanism 15.

Other structures in this embodiment are similar to those in the first embodiment.

According to the projector 1 having this structure in the second embodiment, the control unit 20 commands the lens shift drive unit 29 to shift the projection lens 13 and updates the position information stored in the memory unit 21 when the lens shift key is operated by the user. Then, the control unit 20 determines adjustment coefficients corresponding to the new position of the projection lens 13 for each channel based on the updated position information and the LUT. Subsequently, the control unit 20 multiplies the sound volume level specified by the volume key by the adjustment coefficient, and outputs the calculation result to the audio output unit 26 as sound volume control information similarly to the first embodiment. Then, the audio output unit 26 amplifies the audio signals for the left and right channels such that sounds can be outputted with sound volume corresponding to the sound volume control information. As a result, the volume balance of the sounds outputted from the speakers 27L and 27R becomes almost appropriate for the observer A positioned at the front center of the screen SC. The control unit 20 reads the position information stored in the memory unit 21 immediately after the power source is turned on by operation of the power source key to control the sound volume balance based on the position information and the LUT.

The projector 1 having this structure in the second embodiment offers the following advantages as well as those in the first embodiment.

According to the projector 1 in this embodiment, lens shift is electrically conducted in response to operation inputted through the lens shift key of the input operation unit 22. Thus this lens shift can be performed from a distant place by a remote controller provided with the function of the input operation unit 22 (lens shift key). In this case, usability for the user improves.

According to the projector 1 in this embodiment, the lens shift drive unit 29 shifts the projection lens 13 by a predetermined amount in response to operation of the lens shift key. Thus, the control unit 20 can recognize the position of the projection lens 13 based on the number of times of the operation or the like. Accordingly, a unit for detecting the position of the projection lens 13 (lens shift detecting unit 28) is not required.

In this embodiment, the lens shift key associated with the input operation unit 22, the lens shift mechanism 15, and the lens shift drive unit 29 correspond to the projection position controlling unit.

Modified Example

The following modifications may be made for the embodiments described above.

Figure 8A:
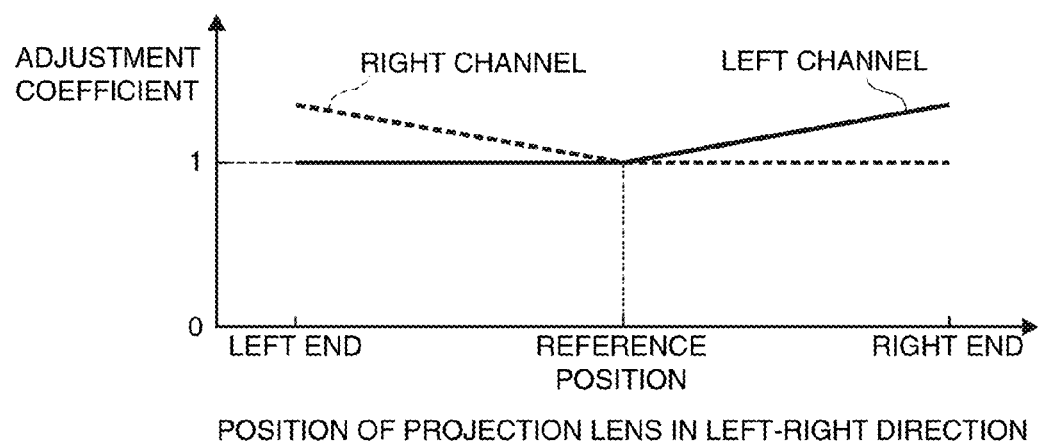
FIGS. 8A through 8C are graphs showing the relationship between positions of a projection lens in the left-right direction and adjustment coefficients for left and right channels according to a modified example.
Figure 8B:
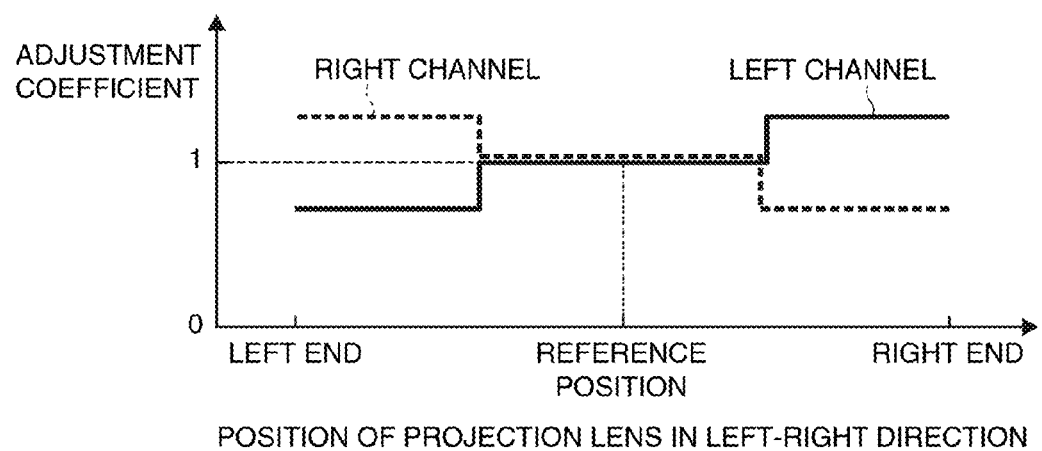
Figure 8C:
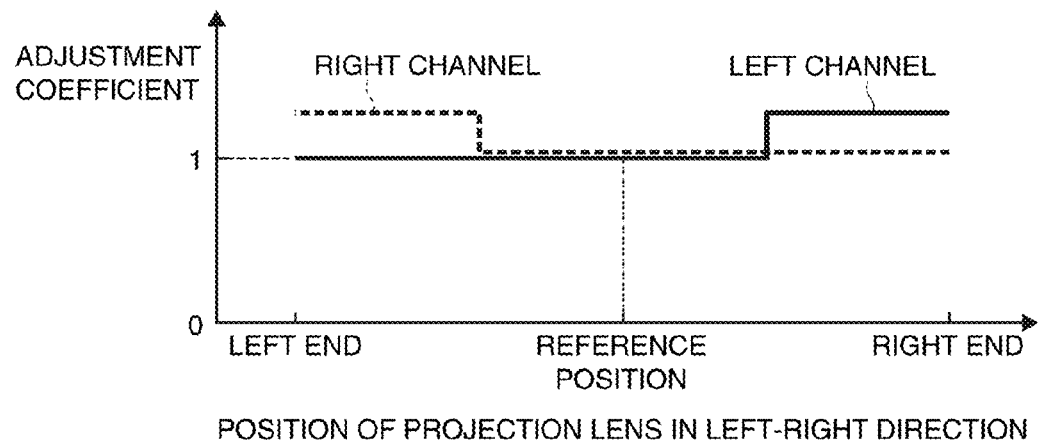

According to the embodiments, the adjustment coefficient (sound volume level) for the left channel decreases and the adjustment coefficient (sound volume level) for the right channel increases as the projection lens 13 shifts toward the left from the reference position. Also, the adjustment coefficient for the left channel increases and the adjustment coefficient for the right channel decreases as the projection lens 13 shifts toward the right from the reference position (see FIG. 5). However, the relationship between the position of the projection lens 13 and the adjustment coefficient (sound volume level) is not limited to this type. It is only required that the sound volume level for the right channel is higher than that for the left channel when the projection lens 13 is located on the left side of the reference position, and that the sound volume level for the left channel is higher than that for the right channel when the projection lens 13 is located on the right side of the reference position. For example, as illustrated in FIG. 8A, the adjustment coefficient for the right channel may be increased with the adjustment coefficient for the left channel maintained at 1 as the projection lens 13 shifts toward the left from the reference position, and the adjustment coefficient for the left channel may be increased with the adjustment coefficient for the right channel maintained at 1 as the projection lens 13 shifts toward the right from the reference position. Alternatively, as illustrated in FIGS. 8B and 8C, the adjustment coefficient (sound volume level) may be step by step varied according to the distance from the reference position. In this case, the number of steps is not limited to one for the left and right channels as shown in the figures, but may be a plural number of steps for varying the adjustment coefficient.

While the DVD reproducing unit 23 capable of reproducing DVD contents is included in the above embodiments, an image reproducing unit capable of reproducing images and sounds recorded on a recording medium other than the DVD medium M may be equipped. This image reproducing unit is not essential, and such a structure which projects images corresponding to image information inputted from an external device and outputs sounds corresponding to audio information inputted from an external device may be provided.

While the transmission type liquid crystal light valves 12R, 12G, and 12B are used as light modulation devices, reflection type light modulation devices such as reflection type liquid crystal light valves may be employed. Alternatively, micromirror array device and the like capable of modulating light emitted from a light source by controlling the light emission direction of the received light for each micromirror as pixel may be used.

While the light source 11 is constituted by the discharge type light source lamp 11a in the embodiments, a solid light source such as LED light source or other types of light source may be used.

What is claimed is:

1. A projector comprising:
a light source;
a light modulation device which forms an image by modulating light emitted from the light source according to inputted image information;
a projection optical system which projects the image formed by the light modulation device;
a projection position controlling unit which controls the projection position of the image by shifting the projection optical system in the left-right direction with respect to the projection direction;
a pair of left and right speakers which output sounds corresponding to audio information inputted with the image information; and
a sound volume adjusting unit which separately adjusts sound volume levels of the sounds outputted from the pair of the speakers based on the control condition of the projection position provided by the projection position controlling unit,
wherein the sound volume adjusting unit sets the sound volume level for one of the right or left speaker included in the pair of the speakers at a level higher than that for the another of the right or left speaker when the projection position controlling unit shifts the projection position toward the another direction from the front center.

2. The projector according to claim 1, wherein the sound volume adjusting unit sets the sound volume level for the right speaker included in the pair of the speakers at a level higher than that for the left speaker when the projection position controlling unit shifts the projection position toward the left from the front center.

3. The projector according to claim 1, wherein the sound volume adjusting unit sets the sound volume level for the left speaker included in the pair of the speakers at a level higher than that for the right speaker when the projection position controlling unit shifts the projection position toward the right from the front center.

4. The projector according to claim 1, further comprising:
a projection position detecting unit which detects the control condition of the projection position,
wherein the sound volume adjusting unit adjusts the sound volume levels of the sounds based on the detection result from the projection position detecting unit.

5. The projector according to claim 1, further comprising:
an input operation unit which receives input operation, wherein
the projection position adjusting unit drives and shifts the projection optical system in response to the input operation received by the input operation unit, and
the sound volume adjusting unit adjusts the sound volume levels of the sounds based on the input operation.

6. The projector according to claim 1, further comprising:
an image reproducing unit which reproduces the image information and the audio information from a recording medium on which the image information and audio information have been recorded.

7. A projector comprising:

a light source;

a light modulation device which forms an image by modulating light emitted from the light source according to inputted image information;

a projection optical system which projects the image formed by the light modulation device;

a projection position controlling unit which controls the projection position of the image by shifting the projection optical system in the left-right direction with respect to the projection direction;

a pair of left and right speakers which output sounds corresponding to audio information inputted with the image information;

a sound volume adjusting unit which separately adjusts sound volume levels of the sounds outputted from the pair of the speakers based on the control condition of the projection position provided by the projection position controlling unit; and a projection position detecting unit which detects the control condition of the projection position, wherein the sound volume adjusting unit adjusts the sound volume levels of the sounds based on the detection result from the projection position detecting unit.

8. A projector comprising:

a light source;

a light modulation device which forms an image by modulating light emitted from the light source according to inputted image information;

a projection optical system which projects the image formed by the light modulation device;

a projection position controlling unit which controls the projection position of the image by shifting the projection optical system in the left-right direction with respect to the projection direction;

a pair of left and right speakers which output sounds corresponding to audio information inputted with the image information;

a sound volume adjusting unit which separately adjusts sound volume levels of the sounds outputted from the pair of the speakers based on the control condition of the projection position provided by the projection position controlling unit; and an input operation unit which receives input operation, wherein:

the projection position adjusting unit drives and shifts the projection optical system in response to the input operation received by the input operation unit, and the sound volume adjusting unit adjusts the sound volume levels of the sounds based on the input operation.

* * * * *